United States Patent
Charytoniuk

(10) Patent No.: US 9,560,097 B2
(45) Date of Patent: *Jan. 31, 2017

(54) DATA MANAGEMENT SYSTEM AND METHOD

(71) Applicant: Google Inc., Mountain View, CA (US)

(72) Inventor: Tomasz Charytoniuk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/683,651

(22) Filed: Apr. 10, 2015

(65) Prior Publication Data
US 2015/0215354 A1    Jul. 30, 2015

Related U.S. Application Data

(63) Continuation of application No. 13/664,750, filed on Oct. 31, 2012, now Pat. No. 9,021,366.

(51) Int. Cl.
*G06Q 10/10*   (2012.01)
*H04L 29/06*   (2006.01)
*G06F 17/30*   (2006.01)

(52) U.S. Cl.
CPC ....... *H04L 65/403* (2013.01); *G06F 17/30268* (2013.01); *G06Q 10/10* (2013.01); *Y10S 715/963* (2013.01)

(58) Field of Classification Search
None
See application file for complete search history.

(56) References Cited

U.S. PATENT DOCUMENTS

| | | |
|---|---|---|
| 7,109,848 B2 | 9/2006 | Schybergson |
| 2004/0125150 A1 | 7/2004 | Adcock et al. |
| 2004/0145602 A1 | 7/2004 | Sun et al. |
| 2004/0250205 A1 | 12/2004 | Conning |
| 2005/0091596 A1 | 4/2005 | Anthony et al. |
| 2009/0106666 A1 | 4/2009 | Nomura |
| 2011/0235858 A1 | 9/2011 | Hanson et al. |
| 2011/0283210 A1 | 11/2011 | Berger et al. |
| 2012/0210200 A1 | 8/2012 | Berger et al. |
| 2012/0278387 A1 | 11/2012 | Garcia et al. |

*Primary Examiner* — Matt Kim
*Assistant Examiner* — Mahelet Shiberou

(57) ABSTRACT

A method and computing system for receiving an indication of a first photo being uploaded to a web-based resource. A first capture date is determined for the first photo. A first object is associated with the first photo. The first object is positioned within a graphical representation of a calendar based, at least in part, upon the first capture date.

20 Claims, 4 Drawing Sheets

DATA MANAGEMENT SYSTEM AND METHOD

CROSS-REFERENCE TO RELATED APPLICATIONS

This application is a continuation of U.S. application Ser. No. 13/664,750 filed Oct. 31, 2012, the disclosure of which is expressly incorporated herein by reference in its entirety.

TECHNICAL FIELD

This disclosure relates to the uploading of photographs and, more particularly, to the displaying of uploaded photographs in a temporal fashion.

BACKGROUND

Included within the Google+ social network is the ability to upload photographs to the social network for storage and sharing. For example, the Google+ social network allows users to automatically upload photographs as they are taken with a digital camera (included within a cell phone) to private photo albums included within the Google+ social network so that they may be shared at a later date.

Unfortunately, when uploading photographs to social networks, they are often uploaded in batches, in which hundreds of photographs are simultaneously uploaded to the social network and placed into a common album. This may make it very difficult to locate specific photographs at a later date, as there is no temporal aspect to the upload.

SUMMARY OF DISCLOSURE

In one implementation, a computer-implemented method includes receiving an indication of a first photo being uploaded to a web-based resource. A first capture date is determined for the first photo. A first object is associated with the first photo. The first object is positioned within a graphical representation of a calendar based, at least in part, upon the first capture date. An indication of a second photo being uploaded to the web-based resource is received. A second capture date is determined for the second photo. A second object is associated with the second photo. The second object is positioned, with respect to the first object, within the graphical representation of the calendar based, at least in part, upon the second capture date.

In another implementation, a computer-implemented method includes receiving an indication of a first photo being uploaded to a web-based resource. A first capture date is determined for the first photo. A first object is associated with the first photo. The first object is positioned within a graphical representation of a calendar based, at least in part, upon the first capture date.

One or more of the following features may be included. The first object may be a text-based first object. The first object may be a thumbnail.

A first capture time may be determined for the first photo. Positioning the first object within a graphical representation of a calendar based, at least in part, upon the first capture date may include positioning the first object within the graphical representation of the calendar based, at least in part, upon the first capture date and the first capture time.

An indication of a second photo being uploaded to the web-based resource may be received. A second capture date may be determined for the second photo. A second object may be associated with the second photo. The second object may be positioned, with respect to the first object, within the graphical representation of the calendar based, at least in part, upon the second capture date.

A second capture time may be determined for the second photo. Positioning the second object, with respect to the first object, within the graphical representation of the calendar based, at least in part, upon the second capture date may include positioning the second object, with respect to the first object, within the graphical representation of the calendar based, at least in part, upon the second capture date and the second capture time.

In another implementation, a computing system includes a processor and memory configured to perform operations including receiving an indication of a first photo being uploaded to a web-based resource. A first capture date is determined for the first photo. A first object is associated with the first photo. The first object is positioned within a graphical representation of a calendar based, at least in part, upon the first capture date.

One or more of the following features may be included. The first object may be a text-based first object. The first object may be a thumbnail.

A first capture time may be determined for the first photo. Positioning the first object within a graphical representation of a calendar based, at least in part, upon the first capture date may include positioning the first object within the graphical representation of the calendar based, at least in part, upon the first capture date and the first capture time.

An indication of a second photo being uploaded to the web-based resource may be received. A second capture date may be determined for the second photo. A second object may be associated with the second photo. The second object may be positioned, with respect to the first object, within the graphical representation of the calendar based, at least in part, upon the second capture date.

A second capture time may be determined for the second photo. Positioning the second object, with respect to the first object, within the graphical representation of the calendar based, at least in part, upon the second capture date may include positioning the second object, with respect to the first object, within the graphical representation of the calendar based, at least in part, upon the second capture date and the second capture time.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED IMPLEMENTATIONS

Figure 1:
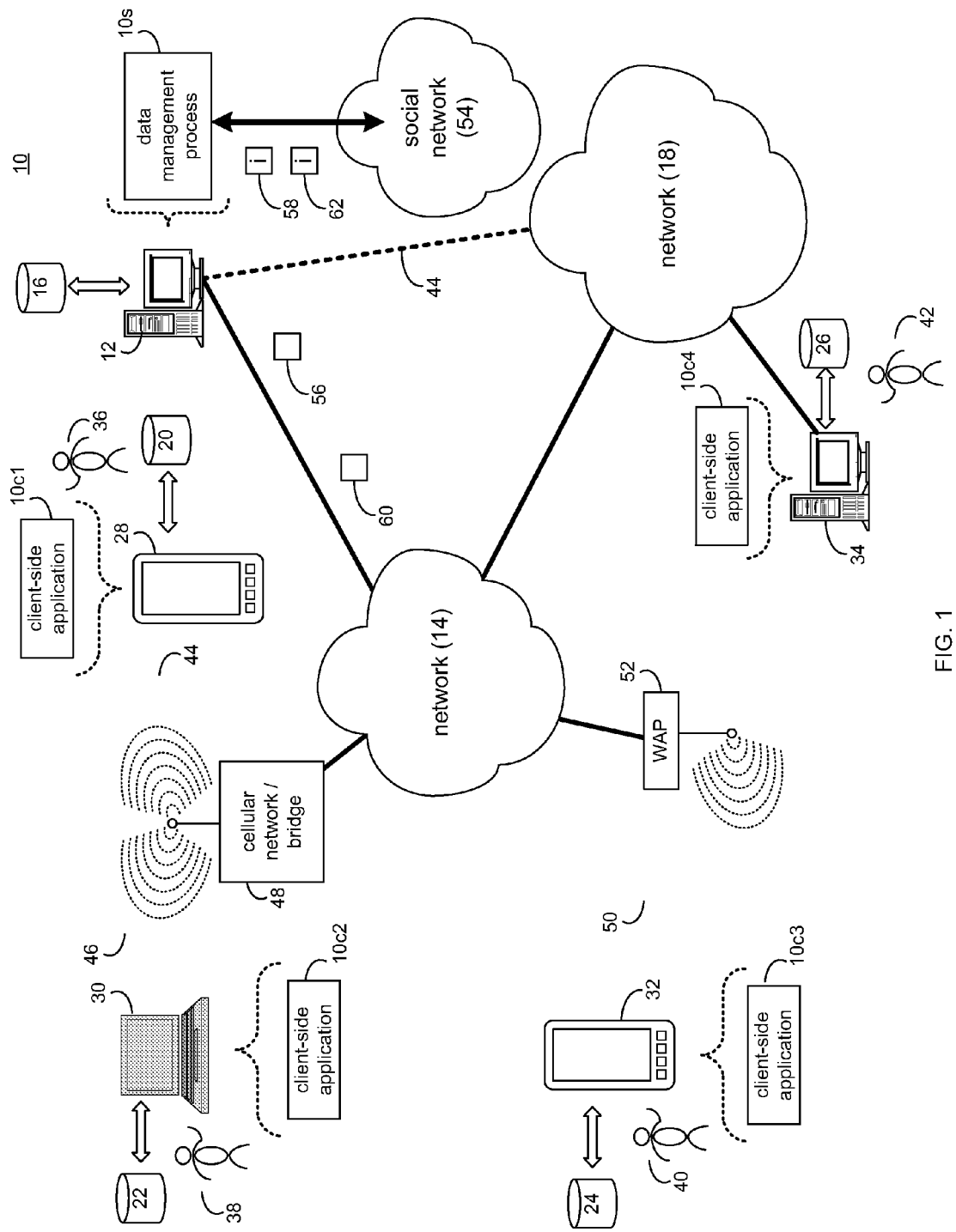
FIG. 1 is a diagrammatic view of a distributed computing network including a computing device that executes a data management process according to an implementation of the present disclosure.
Figure 2:
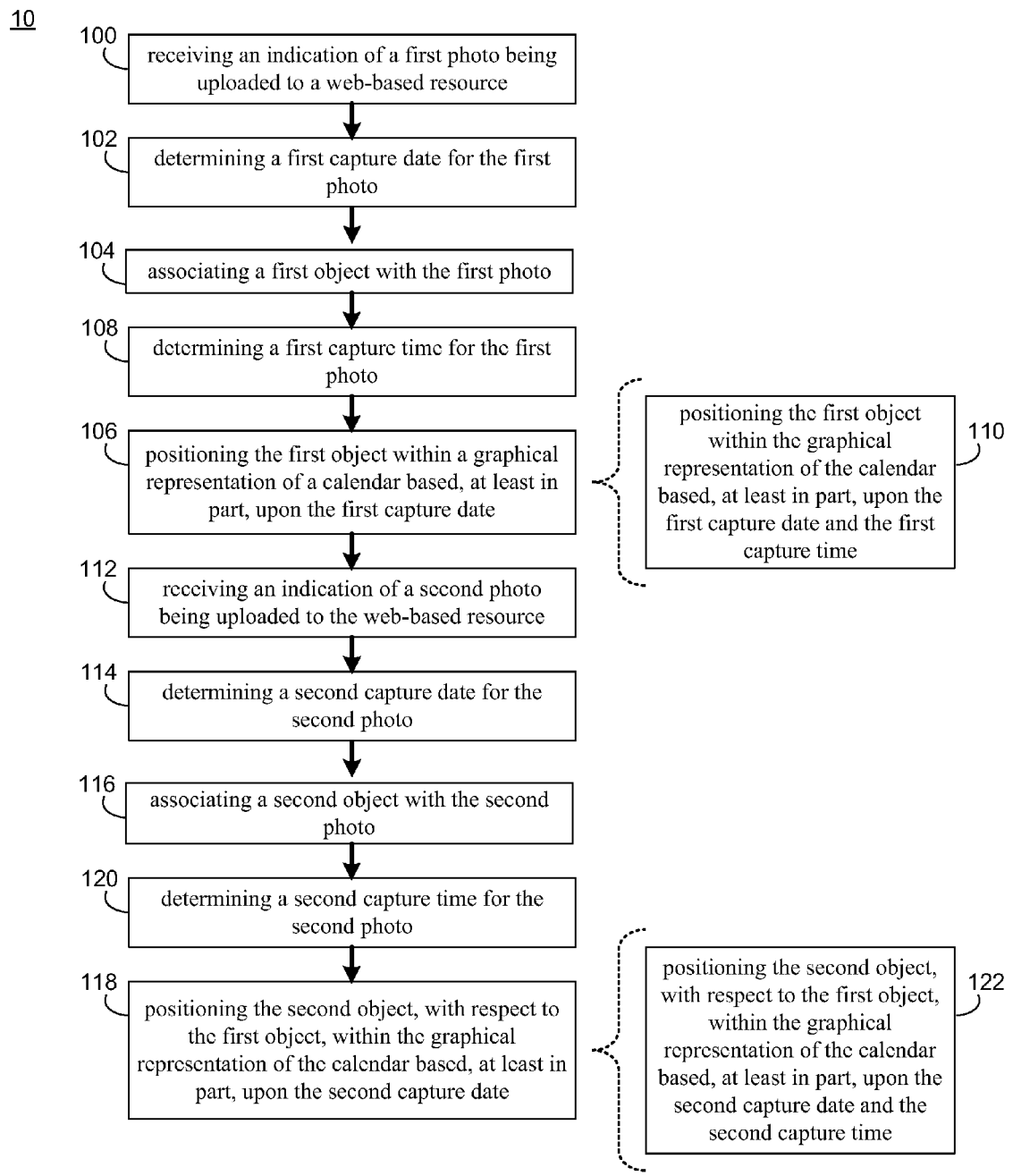
FIG. 2 is a flowchart of the data management process of FIG. 1 according to an implementation of the present disclosure.

In FIGS. 1 & 2, there is shown data management process 10. Data management process 10 may be implemented as a server-side process, a client-side process, or a hybrid server-side/client-side process. For example, data management process 10 may be implemented as a purely server-side process via data management process 10s. Alternatively, data management process 10 may be implemented as a purely client-side process via one or more of client-side application 10c1, client-side application 10c2, client-side application 10c3, and client-side application 10c4. Alternatively still, data management process 10 may be implemented as a hybrid server-side/client-side process via data management process 10s in combination with one or more of client-side application 10c1, client-side application 10c2, client-side application 10c3, and client-side application 10c4. Accordingly, data management process 10 as used in this disclosure may include any combination of data management process 10s, client-side application 10c1, client-side application 10c2, client-side application 10c3, and client-side application 10c4.

As will be discussed below in greater detail, data management process 10 may receive 100 an indication of a first photo being uploaded to a web-based resource. A first capture date may be determined 102 for the first photo. A first object may be associated 104 with the first photo. The first object may be positioned 106 within a graphical representation of a calendar based, at least in part, upon the first capture date.

Data management process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of data management process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, or a specialized application (e.g., an application running on e.g., the Android™ platform or the iPhone™ platform). The instruction sets and subroutines of client-side applications 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access data management process 10 directly through network 14 or through secondary network 18. Further, data management process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Data management process 10 may be included within, executed within, or a portion of social network 54. The phrase social network may be used to refer to a group of technologies (e.g. web-based and mobile technologies) that allow for users to engage in a quasi-real-time, interactive dialogue.

For illustrative purposes, assume that data-enabled, cellular telephone 28 includes a digital camera and that user 36 uses data-enabled, cellular telephone 28 to take photographs. Further assume that user 36 is a user of social network 54 and uploads his photographs to social network 54.

While the following discussion is going to be directed to user 36 uploading photographs to social network 54 (e.g., Google+™), this is for illustrative purposes only and is not intended to be a limitation of this disclosure, as other configurations are possible and are considered to be within the scope of this disclosure and the related claims. For example, user 36 may upload photographs to any web-based resource, such as an online photo repository (e.g., Picasa™) or an online storage system (e.g., Dropbox™).

Assume for illustrative purposes that user 36 takes a digital photograph (e.g., digital photograph 56) using data-enabled, cellular telephone 28 and uploads digital photograph 56 to social network 54. The process of uploading digital photograph 56 to social network 54 may be either a manual process or an automated process. For example, after taking digital photograph 56, user 36 may need (with a manual process) to select the photo and select e.g. upload to social network 54. Alternatively, after taking digital photograph 56, the photograph may be automatically uploaded (with an automated process) to social network 54.

Upon digital photograph 56 being uploaded to social network 54, data management process 10 may receive 100 an indication (e.g. indication 58) of a first photo (e.g. first digital photograph 56) being uploaded to a web-based resource (e.g. social network 54). For example, upon receiving first digital photograph 56, social network 54 may generate indication 58, which may be provided to data management process 10.

Data management process 10 may determine 102 a first capture date for the first photo (e.g. first digital photograph 56). For example, upon receiving indication 58, data management process 10 may determine 102 the date (e.g. first capture date) on which digital photograph 56 was taken. This first capture date may be defined within indication 58 or may require data management process 10 to examine metadata (not shown) associated with first digital photograph 56.

Figure 3:
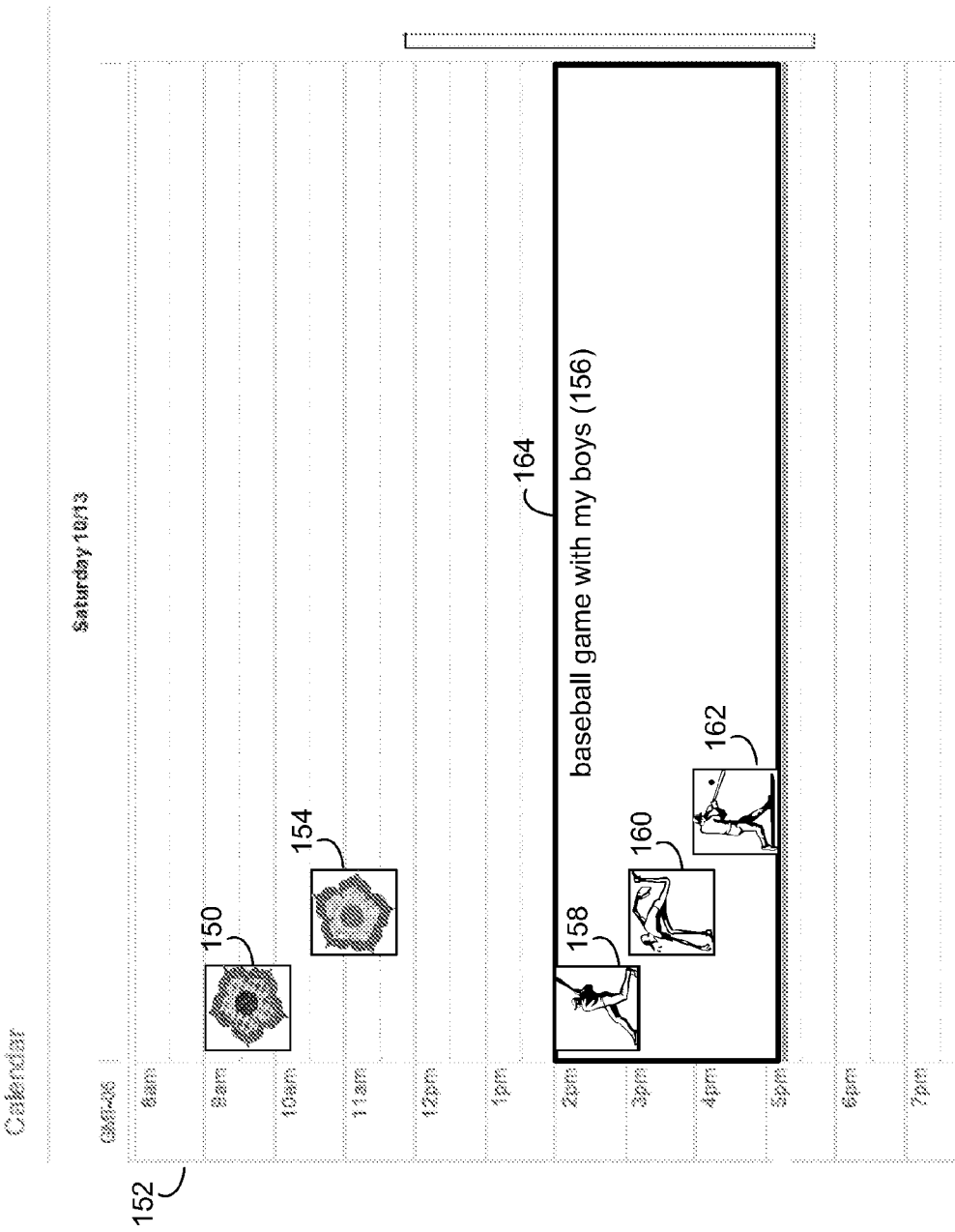
FIG. 3 is diagrammatic view of a display screen rendered by the data management process of FIG. 1 according to an implementation of the present disclosure.

Referring also to FIG. 3, data management process 10 may associate 104 a first object (e.g. first object 150) with the first photo (e.g. first digital photograph 56). Examples of first object 150 may include but are not limited to a text-based first object or a thumbnail of first digital photograph 56. An example of such a text-based first object may include the name of first digital photograph 56. An example of such a thumbnail may include a miniaturized version of first digital photograph 56.

Data management process 10 may position 106 first object 150 within graphical representation 152 of a calendar (e.g., utilized/available within social network 54) based, at least in part, upon the first capture date. For example, assume that user 36 is attending a flower show on 13 Oct. 2012 and, during the course of the flower show, user 36 takes first digital photograph 56 (e.g. a picture of a flower) and uploads the same to social network 54. Data management process 10 may determine 102 a first capture date for first digital photograph 56 (which in this example is 13 Oct. 2012) and may associate 104 first digital photograph 56 with first object 150 (which in this example is a thumbnail of first digital photograph 56). As first digital photograph 56 was taken on 13 Oct. 2012, data management process 10 may position 106 first object 150 within graphical representation 152 of a calendar for 13 Oct. 2012.

Data management process 10 may also determine 108 a first capture time for the first photo (e.g. first digital photograph 56). For example, assume that first digital photograph 56 was taken at 9:00 AM. This first capture time may be defined within indication 58 or may require data management process 10 to examine metadata associated with first digital photograph 56.

If such a first capture time is available for e.g. first digital photograph 56, when positioning 106 first object 150 within graphical representation 152 of the calendar, data management process 10 may position 110 first object 150 within graphical representation 152 of the calendar based, at least in part, upon the first capture date and the first capture time. Accordingly, first object 150 may be positioned proximate the 9:00 AM timeline indicator within graphical representation 152 of the calendar. Accordingly, by reviewing graphical representation 152 of the calendar, user 36 may quickly be able to locate photos that were taken on 13 Oct. 2012 (and the time that each photo was taken).

Assume for illustrative purposes that data management process 10 receives 112 an indication (e.g., indication 62) of a second photo (e.g. second digital photograph 60) being uploaded to the web-based resource (e.g. social network 54). Accordingly, data management process 10 may determine 114 a second capture date for the second photo (e.g. second digital photograph 60) and may associate 116 a second object (e.g. second object 154) with second digital photograph 60.

Continuing with the above-stated example, assume that user 36 takes second digital photograph 60 (e.g. another picture of a flower) and uploads the same to social network 54. Data management process 10 may determine 114 a second capture date for second digital photograph 60 (which in this example is also 13 Oct. 2012) and may associate 116 second digital photograph 60 with second object 154 (which in this example is a thumbnail of second digital photograph 60).

Data management process 10 may position 118 second object 154, with respect to first object 150, within graphical representation 152 of the calendar based, at least in part, upon the second capture date. As second digital photograph 60 was taken on 13 Oct. 2012, data management process 10 may position 118 second object 154 within graphical representation 152 of a calendar for 13 Oct. 2012.

Data management process 10 may also determine 120 a second capture time for the second photo (e.g. second digital photograph 60). For example, assume that second digital photograph 60 was taken at 10:30 AM. This second capture time may be defined within indication 62 or may require data management process 10 to examine metadata associated with second digital photograph 60.

If such a second capture time is available for e.g. second digital photograph 60, when positioning 118 second object 154 within graphical representation 152 of the calendar, data management process 10 may position 122 second object 154, with respect to first object 150, within graphical representation 152 of the calendar based, at least in part, upon the second capture date and the second capture time. Accordingly, second object 154 may be positioned proximate the 10:30 AM timeline indicator within graphical representation 152 of the calendar. Accordingly, by reviewing graphical representation 152 of the calendar, user 36 may quickly be able to locate photos that were taken on 13 Oct. 2012 (and the time that each photo was taken). Additionally, user 36 may easily determine that second digital photograph 60 was taken 90 minutes after first digital photograph 56.

As is known in the art, users of social network 54 (e.g., Google+™) may be able to schedule events, wherein an event is a group activity in which multiple users of the social network may get together for a specific purpose. Examples of such events may include but are not limited to: a group of friends getting together for drinks, several people going to a baseball game together, an end of summer party at a person's house, and a concert at a local arena. Additionally, users may be able to check into such events and upload photos to social network 54 that were taken at/associated with such events.

While the above discussion concerns Google+™, this is for illustrative purposes only and is not intended to be a limitation of this disclosure. For example, event scheduling process 10 may be included within or utilized by any social networking website.

Assume for illustrative purposes that user 36 attends event 156 (e.g. "baseball game with my boys") and, while tending event 156, user 36 uploads three digital photographs, namely digital photographs 158, 160, 162. Data management process 10 may group digital photograph 158, 160, 162 together (e.g. within event frame 164) to indicate that digital photograph 158, 160, 162 are all associated with event 156.

Figure 4:
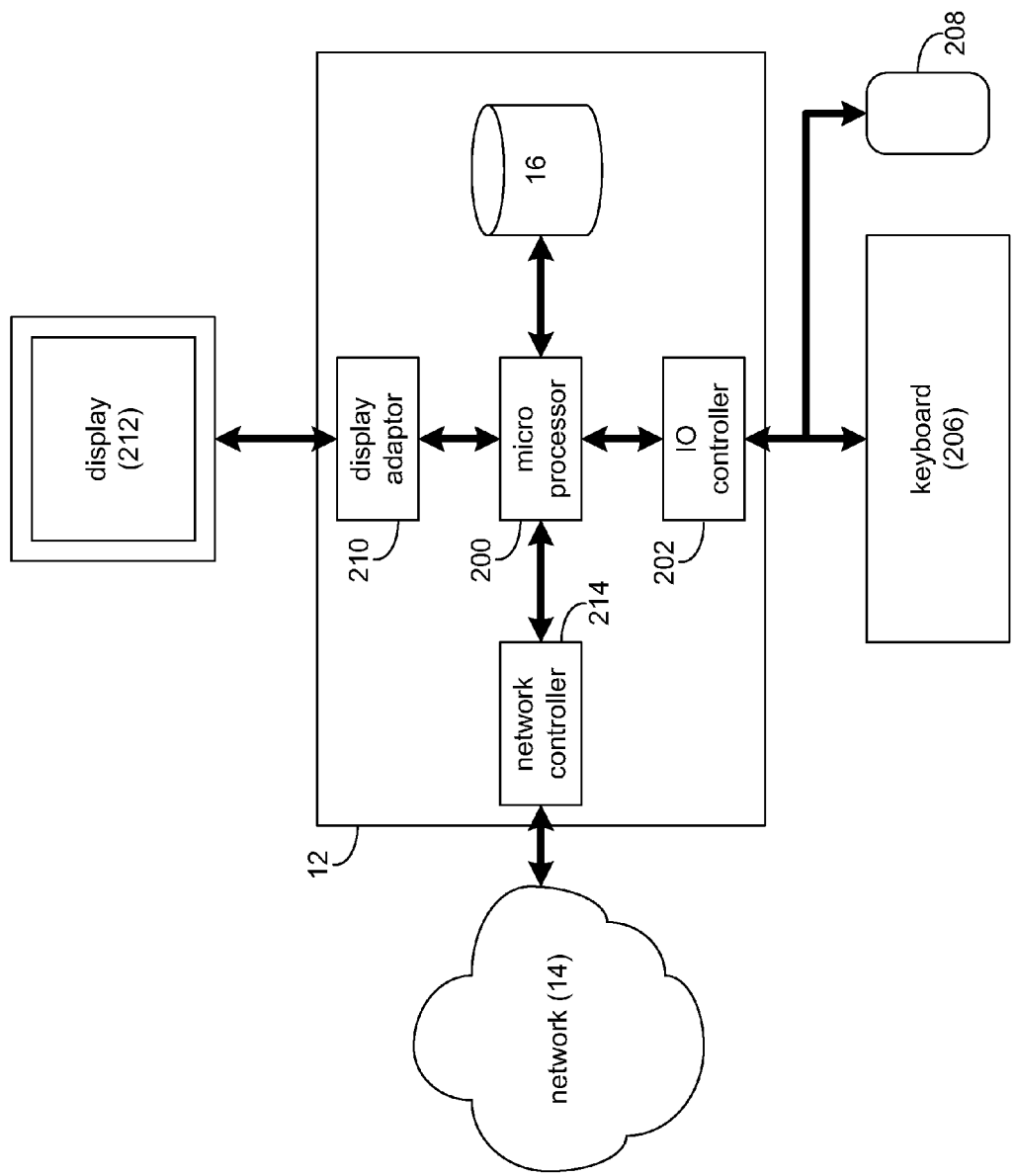
FIG. 4 is a diagrammatic view of the computing device of FIG. 1 according to an implementation of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, data management process 10 may be substituted for computing device 12 within FIG. 4, examples of which may include but are not limited to client electronic devices 28, 30, 32, 34.

Computing system 12 may include microprocessor 200 configured to e.g., process data and execute instructions/code for data management process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims.

What is claimed is:

1. A computer-implemented method comprising:
scheduling an event on a social network that is a group activity for multiple users of the social network using a calendar available within the social network;
receiving an indication of a first photo being uploaded to a web-based resource, wherein a first capture date and a capture time of the first photo being uploaded to the web-based resource is during the event scheduled on the social network with the calendar available within the social network;
associating a first object with the first photo;
associating the first photo with the group activity based at least in part, on the first capture date and first capture time of the first photo and an event date and an event time of the event scheduled on the social network; and
positioning the first object within an event frame for the group activity in a graphical representation of the calendar on the social network.

2. The computer-implemented method of claim 1 wherein the first object is a text-based object.

3. The computer-implemented method of claim 1 wherein the first object is a thumbnail.

4. The computer-implemented method of claim 1 further comprising determining the first capture date and first capture time for the first photo.

5. The computer-implemented method of claim 4 wherein positioning the first object within the graphical representation of a calendar is based, at least in part, on the first capture date and first capture time.

6. The computer-implemented method of claim 5, further comprising:
receiving a second indication of a second photo being uploaded to the web-based resource
determining a second capture date and second capture time for the second photo
associating a second object with the second photo; and
positioning the second object, with respect to the first object, within the graphical representation of the calendar based, at least in part, upon the second capture date and second capture time.

7. The computer-implemented method of claim 1, wherein positioning the first object comprises positioning the first object proximate to a timeline indicator within the graphical representation of the calendar.

8. A system comprising a hardware network adapter and a non-transitory machine-readable medium including instructions that when operated upon by a machine cause the machine to:
schedule an event on a social network that is a group activity for multiple users of the social network;
receive a first photo uploaded to a web-based resource using the network adapter, wherein a first capture date and a first capture time of the first photo uploaded to the web-based resource is during the event scheduled on the social network;
associate a first object with the first photo;
associate the first photo with the group activity based at least in part, on the first capture date and the first capture time of the first photo and an event date and an event time of the event scheduled on the social network; and
position the first object within an event frame for the group activity in a graphical representation of a calendar on the social network.

9. The system of claim 8, wherein the first object is a text-based object.

10. The system of claim 8 wherein the first object is a thumbnail.

11. The system of claim 8, wherein the instructions further cause the machine to:
determine the first capture date and the first capture time for the first photo.

12. The system of claim 8, wherein the instructions to position the first object within the graphical representation of a calendar further cause the machine to position the first object within the graphical representation of the calendar based, at least in part, on the first capture date and the first capture time.

13. The system of claim 12, wherein the instructions further cause the machine to:
receive a second photo uploaded to the web-based resource determine a second capture date and second capture time for the second photo associate a second object with the second photo; and position the second object, with respect to the first object, within the graphical representation of the calendar based, at least in part, upon the second capture date and second capture time.

14. The system of claim 13, wherein the instructions to position the first object further comprise instructions to position the first object proximate to a timeline indicator within the graphical representation of the calendar.

15. A non-transitory computer-readable medium storing a computer program that is executable by at least one processor, the computer program including instructions that cause the at least one processor to perform operations comprising:

schedule an event on a social network that is a group activity for multiple users of the social network;

receive an indication of a first photo uploaded to a web-based resource, wherein a first capture date and a first capture time of the first photo being uploaded to the web-based resource is during the event scheduled on the social network;

associate a first object with the first photo;

associate the first photo with the group activity based at least in part, on the first capture date and the first capture time of the first photo and an event date and an event time of the event scheduled on the social network; and position the first object within an event frame for the group activity in a graphical representation of a calendar on the social network.

16. The computer-readable medium of claim 15, wherein the first object is a text-based object.

17. The computer-readable medium of claim 15, wherein the first object is a thumbnail.

18. The computer-readable medium of claim 15, wherein the instructions further cause the at least one processor to determine the first capture date and the first capture time for the first photo.

19. The computer-readable medium of claim 15, wherein the instructions to position the first object within the graphical representation of a calendar further cause the at least one processor to position the first object within the graphical representation of the calendar based, at least in part, on the first capture date and the first capture time.

20. The computer-readable medium of claim 19, wherein the instructions to position the first object further cause the at least one processor to position the first object proximate to a timeline indicator within the graphical representation of the calendar.

* * * * *